US007818176B2

(12) United States Patent
Freeman et al.

(10) Patent No.: US 7,818,176 B2
(45) Date of Patent: Oct. 19, 2010

(54) SYSTEM AND METHOD FOR SELECTING AND PRESENTING ADVERTISEMENTS BASED ON NATURAL LANGUAGE PROCESSING OF VOICE-BASED INPUT

(75) Inventors: Tom Freeman, Mercer Island, WA (US); Mike Kennewick, Bellevue, WA (US)

(73) Assignee: VoiceBox Technologies, Inc., Bellevue, WA (US)

( * ) Notice: Subject to any disclaimer, the term of this patent is extended or adjusted under 35 U.S.C. 154(b) by 740 days.

(21) Appl. No.: 11/671,526

(22) Filed: Feb. 6, 2007

(65) Prior Publication Data

US 2008/0189110 A1 Aug. 7, 2008

(51) Int. Cl.
*G10L 11/00* (2006.01)
*G10L 15/18* (2006.01)
*G06F 17/27* (2006.01)
*G06Q 30/00* (2006.01)

(52) U.S. Cl. ............................ 704/270; 704/9; 704/257; 705/14.49

(58) Field of Classification Search ....................... None
See application file for complete search history.

(56) References Cited

U.S. PATENT DOCUMENTS

| | | | |
|---|---|---|---|
| 4,430,669 A | 2/1984 | Cheung | 358/122 |
| 5,155,743 A | 10/1992 | Jacobs | 375/28 |
| 5,274,560 A | 12/1993 | LaRue | 364/444 |
| 5,377,350 A | 12/1994 | Skinner | 395/600 |
| 5,386,556 A | 1/1995 | Hedin et al. | 395/600 |
| 5,424,947 A | 6/1995 | Nagao et al. | 364/419.08 |
| 5,471,318 A | 11/1995 | Ahuja et al. | 358/400 |
| 5,475,733 A | 12/1995 | Eisdorfer et al. | 379/52 |
| 5,488,652 A | 1/1996 | Bielby et al. | 379/88 |
| 5,499,289 A | 3/1996 | Bruno et al. | 379/220 |
| 5,500,920 A | 3/1996 | Kupiec | 395/2.79 |
| 5,517,560 A | 5/1996 | Greenspan | 379/114 |
| 5,533,108 A | 7/1996 | Harris et al. | 379/201 |
| 5,537,436 A | 7/1996 | Bottoms et al. | 375/222 |
| 5,539,744 A | 7/1996 | Chu et al. | 370/60 |
| 5,557,667 A | 9/1996 | Bruno et al. | 379/201 |

(Continued)

FOREIGN PATENT DOCUMENTS

WO WO 01/78065 10/2001

OTHER PUBLICATIONS

Reuters, "IBM to Enable Honda Drivers to Talk to Cars", Charles Schwab & Co., Inc., Jul. 28, 2002, 1 page.

(Continued)

*Primary Examiner*—Brian L Albertalli
(74) *Attorney, Agent, or Firm*—Pillsbury Winthrop Shaw Pittman LLP

(57) ABSTRACT

A system and method for selecting and presenting advertisements based on natural language processing of voice-based inputs is provided. A user utterance may be received at an input device, and a conversational, natural language processor may identify a request from the utterance. At least one advertisement may be selected and presented to the user based on the identified request. The advertisement may be presented as a natural language response, thereby creating a conversational feel to the presentation of advertisements. The request and the user's subsequent interaction with the advertisement may be tracked to build user statistical profiles, thus enhancing subsequent selection and presentation of advertisements.

52 Claims, 3 Drawing Sheets

U.S. PATENT DOCUMENTS

| | | | | |
|---|---|---|---|---|
| 5,563,937 | A | 10/1996 | Bruno et al. | 379/201 |
| 5,590,039 | A | 12/1996 | Ikeda et al. | 395/759 |
| 5,617,407 | A | 4/1997 | Bareis | 369/275.3 |
| 5,633,922 | A | 5/1997 | August et al. | 379/220 |
| 5,675,629 | A | 10/1997 | Raffel et al. | 379/58 |
| 5,696,965 | A | 12/1997 | Dedrick | 395/610 |
| 5,708,422 | A | 1/1998 | Blonder et al. | 340/825.34 |
| 5,721,938 | A | 2/1998 | Stuckey | 395/754 |
| 5,722,084 | A | 2/1998 | Chakrin et al. | 455/551 |
| 5,742,763 | A | 4/1998 | Jones | 395/200.3 |
| 5,748,841 | A | 5/1998 | Morin et al. | 395/2.66 |
| 5,752,052 | A | 5/1998 | Richardson et al. | 395/759 |
| 5,754,784 | A | 5/1998 | Garland et al. | 395/200.49 |
| 5,761,631 | A | 6/1998 | Nasukawa | 704/9 |
| 5,774,859 | A | 6/1998 | Houser et al. | 704/275 |
| 5,794,050 | A | 8/1998 | Dahlgren et al. | 395/708 |
| 5,797,112 | A | 8/1998 | Komatsu et al. | 701/201 |
| 5,799,276 | A | 8/1998 | Komissarchik et al. | 704/251 |
| 5,802,510 | A | 9/1998 | Jones | 707/2 |
| 5,832,221 | A | 11/1998 | Jones | 375/200.36 |
| 5,878,385 | A | 3/1999 | Bralich et al. | 704/9 |
| 5,878,386 | A | 3/1999 | Coughlin | 704/10 |
| 5,892,813 | A | 4/1999 | Morin et al. | 379/88.01 |
| 5,895,464 | A | 4/1999 | Bhandari et al. | 707/3 |
| 5,895,466 | A | 4/1999 | Goldberg et al. | 707/5 |
| 5,902,347 | A | 5/1999 | Backman et al. | 701/200 |
| 5,911,120 | A | 6/1999 | Jarett et al. | 455/417 |
| 5,918,222 | A | 6/1999 | Fukui et al. | 707/1 |
| 5,926,784 | A | 7/1999 | Richardson et al. | 704/9 |
| 5,933,822 | A | 8/1999 | Braden-Harder et al. | 707/5 |
| 5,953,393 | A | 9/1999 | Culbreth et al. | 379/88.25 |
| 5,963,894 | A | 10/1999 | Richardson et al. | 704/9 |
| 5,963,940 | A | 10/1999 | Liddy et al. | 707/5 |
| 5,987,404 | A | 11/1999 | Della Pietra et al. | 704/9 |
| 5,991,721 | A | 11/1999 | Asano et al. | 704/257 |
| 5,995,119 | A | 11/1999 | Cosatto et al. | 345/473 |
| 6,009,382 | A | 12/1999 | Martino et al. | 704/1 |
| 6,014,559 | A | 1/2000 | Amin | 455/413 |
| 6,021,384 | A | 2/2000 | Gorin et al. | 704/1 |
| 6,044,347 | A | 3/2000 | Abella et al. | 704/272 |
| 6,049,602 | A | 4/2000 | Foladare et al. | 379/265 |
| 6,058,187 | A | 5/2000 | Chen | 380/21 |
| 6,078,886 | A | 6/2000 | Dragosh et al. | 704/270 |
| 6,081,774 | A | 6/2000 | De Hita et al. | 704/9 |
| 6,101,241 | A | 8/2000 | Boyce et al. | 379/88.01 |
| 6,119,087 | A | 9/2000 | Kuhn et al. | 704/270 |
| 6,134,235 | A | 10/2000 | Goldman et al. | 370/352 |
| 6,144,667 | A | 11/2000 | Doshi et al. | 370/401 |
| 6,144,938 | A | 11/2000 | Surace et al. | 704/257 |
| 6,154,526 | A | 11/2000 | Dahlke et al. | 379/88.03 |
| 6,160,883 | A | 12/2000 | Jackson et al. | 379/230 |
| 6,173,279 | B1 | 1/2001 | Levin et al. | 707/5 |
| 6,175,858 | B1 | 1/2001 | Bulfer et al. | 709/206 |
| 6,185,535 | B1 | 2/2001 | Hedin et al. | 704/270 |
| 6,192,110 | B1 | 2/2001 | Abella et al. | 379/88.01 |
| 6,192,338 | B1 | 2/2001 | Haszto et al. | 704/257 |
| 6,195,634 | B1 | 2/2001 | Dudemaine et al. | 704/231 |
| 6,195,651 | B1 | 2/2001 | Handel et al. | 707/2 |
| 6,208,972 | B1 | 3/2001 | Grant et al. | 704/275 |
| 6,219,346 | B1 | 4/2001 | Maxemchuk | 370/338 |
| 6,219,643 | B1 | 4/2001 | Cohen et al. | 704/257 |
| 6,226,612 | B1 | 5/2001 | Srenger et al. | 704/256 |
| 6,233,556 | B1 | 5/2001 | Teunen et al. | 704/250 |
| 6,233,559 | B1 | 5/2001 | Balakrishnan | 704/275 |
| 6,246,981 | B1 | 6/2001 | Papineni et al. | 704/235 |
| 6,272,455 | B1 | 8/2001 | Hoshen et al. | 704/1 |
| 6,288,319 | B1 | 9/2001 | Catona | 84/609 |
| 6,292,767 | B1 | 9/2001 | Jackson et al. | 704/1 |
| 6,308,151 | B1 | 10/2001 | Smith | 704/235 |
| 6,314,402 | B1 | 11/2001 | Monaco et al. | 704/275 |
| 6,366,886 | B1 | 4/2002 | Dragosh et al. | 704/270.1 |
| 6,374,214 | B1 | 4/2002 | Friedland et al. | 704/235 |
| 6,381,535 | B1 | 4/2002 | Durocher et al. | 701/202 |
| 6,385,596 | B1 | 5/2002 | Wiser et al. | 705/51 |
| 6,385,646 | B1 | 5/2002 | Brown et al. | 709/217 |
| 6,393,428 | B1 | 5/2002 | Miller et al. | 707/102 |
| 6,404,878 | B1 | 6/2002 | Jackson et al. | 379/221.01 |
| 6,408,272 | B1 | 6/2002 | White et al. | 704/270.1 |
| 6,411,810 | B1 | 6/2002 | Maxemchuk | 455/453 |
| 6,415,257 | B1 | 7/2002 | Junqua et al. | 704/275 |
| 6,418,210 | B1 | 7/2002 | Sayko | 379/142.15 |
| 6,420,975 | B1 | 7/2002 | DeLine et al. | 340/815.4 |
| 6,430,285 | B1 | 8/2002 | Bauer et al. | 379/265.01 |
| 6,430,531 | B1 | 8/2002 | Polish | 704/257 |
| 6,434,523 | B1 | 8/2002 | Monaco | 704/257 |
| 6,434,524 | B1 | 8/2002 | Weber | 704/257 |
| 6,442,522 | B1 | 8/2002 | Carberry et al. | 704/257 |
| 6,446,114 | B1 | 9/2002 | Bulfer et al. | 709/206 |
| 6,453,153 | B1 | 9/2002 | Bowker et al. | 455/67.4 |
| 6,453,292 | B2 | 9/2002 | Ramaswamy et al. | 704/235 |
| 6,456,711 | B1 | 9/2002 | Cheung et al. | 379/265.09 |
| 6,466,654 | B1 | 10/2002 | Cooper et al. | 379/88.01 |
| 6,466,899 | B1 | 10/2002 | Yano et al. | 704/1 |
| 6,498,797 | B1 | 12/2002 | Anerousis et al. | 370/522 |
| 6,499,013 | B1 | 12/2002 | Weber | 704/257 |
| 6,501,833 | B2 | 12/2002 | Phillips et al. | 379/88.07 |
| 6,501,834 | B1 | 12/2002 | Milewski et al. | 379/93.24 |
| 6,513,006 | B2 | 1/2003 | Howard et al. | 704/257 |
| 6,523,061 | B1 | 2/2003 | Halverson et al. | 709/202 |
| 6,532,444 | B1 | 3/2003 | Weber | 704/257 |
| 6,539,348 | B1 | 3/2003 | Bond et al. | 704/9 |
| 6,553,372 | B1 | 4/2003 | Brassell et al. | 707/5 |
| 6,556,970 | B1 | 4/2003 | Sasaki et al. | 704/257 |
| 6,556,973 | B1 | 4/2003 | Lewin | 704/277 |
| 6,560,576 | B1 | 5/2003 | Cohen et al. | 704/270 |
| 6,567,778 | B1 | 5/2003 | Chao Chang et al. | 704/257 |
| 6,567,797 | B1 | 5/2003 | Schuetze et al. | 707/2 |
| 6,570,555 | B1 | 5/2003 | Prevost et al. | 345/156 |
| 6,570,964 | B1 | 5/2003 | Murveit et al. | 379/67.1 |
| 6,574,597 | B1 | 6/2003 | Mohri et al. | 704/251 |
| 6,574,624 | B1 | 6/2003 | Johnson et al. | 707/5 |
| 6,581,103 | B1 | 6/2003 | Dengler | 709/231 |
| 6,594,257 | B1 | 7/2003 | Doshi et al. | 370/352 |
| 6,598,018 | B1 | 7/2003 | Junqua | 704/251 |
| 6,604,077 | B2 | 8/2003 | Dragosh et al. | 704/270.1 |
| 6,611,692 | B2 | 8/2003 | Raffel et al. | 455/552 |
| 6,614,773 | B1 | 9/2003 | Maxemchuk | 370/337 |
| 6,615,172 | B1 | 9/2003 | Bennett et al. | 704/257 |
| 6,629,066 | B1 | 9/2003 | Jackson et al. | 704/9 |
| 6,631,346 | B1 | 10/2003 | Karaorman et al. | 704/9 |
| 6,643,620 | B1 | 11/2003 | Contolini et al. | 704/270 |
| 6,650,747 | B1 | 11/2003 | Bala et al. | 379/265.06 |
| 6,678,680 | B1 | 1/2004 | Woo | 707/6 |
| 6,691,151 | B1 | 2/2004 | Cheyer et al. | 709/202 |
| 6,721,001 | B1 | 4/2004 | Berstis | 348/231.3 |
| 6,721,706 | B1 | 4/2004 | Strubbe et al. | 704/275 |
| 6,735,592 | B1 | 5/2004 | Neumann et al. | 707/101 |
| 6,741,931 | B1 | 5/2004 | Kohut et al. | 701/209 |
| 6,742,021 | B1 | 5/2004 | Halverson et al. | 709/218 |
| 6,757,718 | B1 | 6/2004 | Halverson et al. | 709/218 |
| 6,795,808 | B1 | 9/2004 | Strubbe et al. | 704/275 |
| 6,801,604 | B2 | 10/2004 | Maes et al. | 379/88.17 |
| 6,801,893 | B1 | 10/2004 | Backfried et al. | 704/257 |
| 6,833,848 | B1 | 12/2004 | Wolff et al. | 345/719 |
| 6,856,990 | B2 | 2/2005 | Barile et al. | 707/10 |
| 6,865,481 | B2 | 3/2005 | Kawazoe et al. | 701/211 |
| 6,877,134 | B1 | 4/2005 | Fuller et al. | 715/500.1 |
| 6,901,366 | B1 | 5/2005 | Kuhn et al. | 704/275 |
| 6,937,977 | B2 | 8/2005 | Gerson | 704/201 |
| 6,944,594 | B2 | 9/2005 | Busayapongchai et al. | 704/275 |
| 6,950,821 | B2 | 9/2005 | Faybishenko et al. | 707/10 |
| 6,973,387 | B2 | 12/2005 | Masclet et al. | 701/211 |
| 6,980,092 | B2 | 12/2005 | Turnbull et al. | 340/425.5 |
| 6,990,513 | B2 | 1/2006 | Belfiore et al. | 709/203 |

| | | | | |
|---|---|---|---|---|
| 6,996,531 B2 | 2/2006 | Korall et al. ............... 704/270 |
| 7,016,849 B2 | 3/2006 | Arnold et al. .............. 704/275 |
| 7,020,609 B2 | 3/2006 | Thrift et al. ............. 704/270.1 |
| 7,027,975 B1 | 4/2006 | Pazandak et al. ............. 704/9 |
| 7,062,488 B1 | 6/2006 | Reisman ...................... 707/8 |
| 7,082,469 B2 | 7/2006 | Gold et al. ................. 709/231 |
| 7,092,928 B1 | 8/2006 | Elad et al. .................... 706/60 |
| 7,127,400 B2 | 10/2006 | Koch ...................... 704/270.1 |
| 7,136,875 B2 | 11/2006 | Anderson et al. ........ 707/104.1 |
| 7,137,126 B1 | 11/2006 | Coffman et al. ............ 719/328 |
| 7,146,319 B2 | 12/2006 | Hunt ......................... 704/254 |
| 7,203,644 B2 | 4/2007 | Anderson et al. .......... 704/246 |
| 7,228,276 B2 | 6/2007 | Omote et al. .............. 704/243 |
| 7,289,606 B2 | 10/2007 | Sibal et al. ................... 379/52 |
| 7,301,093 B2 | 11/2007 | Sater et al. ................... 84/615 |
| 7,340,040 B1 | 3/2008 | Saylor et al. .............. 379/67.1 |
| 7,376,645 B2 | 5/2008 | Bernard ........................ 707/3 |
| 7,398,209 B2 | 7/2008 | Kennewick et al. ........ 704/255 |
| 7,424,431 B2 | 9/2008 | Greene et al. .............. 704/270 |
| 7,461,059 B2* | 12/2008 | Richardson et al. ........... 707/5 |
| 7,487,088 B1 | 2/2009 | Gorin et al. ................ 704/240 |
| 7,493,559 B1 | 2/2009 | Wolff et al. ................ 715/727 |
| 7,502,738 B2 | 3/2009 | Kennewick et al. ........ 704/257 |
| 7,620,549 B2 | 11/2009 | Di Cristo et al. ........... 704/257 |
| 7,634,409 B2 | 12/2009 | Kennewick et al. ........ 704/257 |
| 7,640,160 B2 | 12/2009 | Di Cristo et al. ........... 704/257 |
| 7,693,720 B2 | 4/2010 | Kennewick et al. ........ 704/275 |
| 2001/0041980 A1 | 11/2001 | Howard et al. ............. 704/270 |
| 2002/0049805 A1 | 4/2002 | Yamada et al. ............. 709/202 |
| 2002/0065568 A1 | 5/2002 | Silfvast et al. .............. 700/94 |
| 2002/0069059 A1 | 6/2002 | Smith ........................ 704/257 |
| 2002/0082911 A1 | 6/2002 | Dunn et al. .................. 705/14 |
| 2002/0120609 A1 | 8/2002 | Lang et al. ..................... 707/1 |
| 2002/0124050 A1 | 9/2002 | Middeljans ................ 709/203 |
| 2002/0138248 A1 | 9/2002 | Corston-Oliver et al. ....... 704/1 |
| 2002/0143535 A1 | 10/2002 | Kist et al. ................... 704/251 |
| 2002/0188602 A1 | 12/2002 | Stubler et al. ................. 707/3 |
| 2002/0198714 A1 | 12/2002 | Zhou .......................... 704/252 |
| 2003/0014261 A1 | 1/2003 | Kageyama .................. 704/275 |
| 2003/0088421 A1 | 5/2003 | Maes et al. ............. 704/270.1 |
| 2003/0097249 A1 | 5/2003 | Walker et al. .................. 704/1 |
| 2003/0112267 A1 | 6/2003 | Belrose ...................... 345/728 |
| 2003/0135488 A1 | 7/2003 | Amir et al. ..................... 707/3 |
| 2003/0182132 A1 | 9/2003 | Niemoeller ................. 704/275 |
| 2004/0025115 A1 | 2/2004 | Sienel et al. ................ 715/513 |
| 2004/0044516 A1 | 3/2004 | Kennewick et al. ............ 704/5 |
| 2004/0166832 A1 | 8/2004 | Portman et al. .......... 455/412.1 |
| 2004/0193420 A1 | 9/2004 | Kennewick et al. ........ 704/257 |
| 2004/0199375 A1 | 10/2004 | Ehsani et al. ................... 704/4 |
| 2005/0015256 A1 | 1/2005 | Kargman .................... 704/272 |
| 2005/0021334 A1 | 1/2005 | Iwahashi .................... 704/240 |
| 2005/0021826 A1 | 1/2005 | Kumar ........................ 709/232 |
| 2005/0033574 A1 | 2/2005 | Kim et al. ................... 704/251 |
| 2005/0114116 A1 | 5/2005 | Fiedler ........................ 704/201 |
| 2005/0246174 A1* | 11/2005 | DeGolia ..................... 704/270 |
| 2006/0206310 A1 | 9/2006 | Ravikumar et al. ............. 704/9 |
| 2007/0033005 A1 | 2/2007 | Cristo et al. .................... 704/9 |
| 2007/0038436 A1 | 2/2007 | Cristo et al. .................... 704/9 |
| 2007/0043574 A1 | 2/2007 | Coffman et al. ............ 704/275 |
| 2007/0050191 A1 | 3/2007 | Weider et al. .............. 704/275 |
| 2007/0186165 A1* | 8/2007 | Maislos et al. ............. 715/728 |
| 2007/0214182 A1 | 9/2007 | Rosenberg .............. 707/104.1 |
| 2007/0250901 A1 | 10/2007 | McIntire et al. ............ 725/146 |
| 2007/0299824 A1 | 12/2007 | Pan et al. ....................... 707/3 |
| 2008/0091406 A1 | 4/2008 | Baldwin et al. ................ 704/4 |
| 2008/0103761 A1* | 5/2008 | Printz et al. .................... 704/9 |
| 2008/0115163 A1* | 5/2008 | Gilboa et al. ................. 725/34 |
| 2008/0133215 A1* | 6/2008 | Sarukkai ........................ 704/2 |
| 2008/0235023 A1 | 9/2008 | Kennewick et al. ......... 704/257 |
| 2008/0235027 A1 | 9/2008 | Cross ...................... 704/270.1 |
| 2008/0319751 A1 | 12/2008 | Kennewick et al. ......... 704/257 |
| 2009/0117885 A1* | 5/2009 | Roth ........................ 455/414.3 |
| 2009/0144271 A1* | 6/2009 | Richardson et al. ............ 707/5 |
| 2009/0150156 A1 | 6/2009 | Kennewick et al. ......... 704/257 |
| 2009/0171664 A1 | 7/2009 | Kennewick et al. ......... 704/257 |
| 2009/0299745 A1 | 12/2009 | Kennewick et al. ......... 704/257 |
| 2010/0023320 A1 | 1/2010 | Di Cristo et al. ................ 704/9 |
| 2010/0049501 A1 | 2/2010 | Kennewick et al. ............. 704/9 |
| 2010/0049514 A1 | 2/2010 | Kennewick et al. ......... 704/233 |
| 2010/0057443 A1 | 3/2010 | Di Cristo et al. ................ 704/9 |
| 2010/0063880 A1* | 3/2010 | Atsmon et al. ........... 705/14.53 |
| 2010/0145700 A1 | 6/2010 | Kennewick et al. ......... 704/257 |

OTHER PUBLICATIONS

Lin, Bor-shen, et al., "A Distributed Architecture for Cooperative Spoken Dialogue Agents with Coherent Dialogue State and History", ASRU'99, 1999, 4 pages.

Kuhn, Thomas, et al., "Hybrid In-Car Speech Recognition for Mobile Multimedia Applications", Vehicular Technology Conference, IEEE, Jul. 1999, pp. 2009-2013.

Belvin, Robert, et al., "Development of the HRL Route Navigation Dialogue System", Proceedings of the First International Conference on Human Language Technology Research, San Diego, 2001, pp. 1-5.

Lind, R., et al., "The Network Vehicle—A Glimpse into the Future of Mobile Multi-Media", *IEEE Aerosp. Electron. Systems Magazine,* vol. 14, No. 9, Sep. 1999, pp. 27-32.

Zhao, Yilin, "Telematics: Safe and Fun Driving", *IEEE Intelligent Systems,* vol. 17, Issue 1, 2002, pp. 10-14.

Chai et al., "MIND: A Semantics-Based Multimodal Interpretation Framework for Conversational System", *Proceedings of the International Class Workshop on Natural, Intelligent and Effective Interaction in Multimodal Dialogue Systems,* Jun. 2002, pp. 37-46.

Cheyer et al., "Multimodal Maps: An Agent-Based Approach", *International Conference on Cooperative Multimodal Communication (CMC/95),* May 24-26, 1995, pp. 111-121.

Elio et al., "On Abstract Task Models and Conversation Policies" in Workshop on Specifying and Implementing Conversation Policies, *Autonomous Agents '99,* Seattle, 1999, 10 pages.

Turunen, "Adaptive Interaction Methods in Speech User Interfaces", Conference on Human Factors in Computing Systems, Seattle, Washington, 2001,. pp. 91-92.

Mao, Mark Z., "Automatic Training Set Segmentation for Multi-Pass Speech Recognition", Department of Electrical Engineering, Stanford University, CA, copyright 2005, IEEE, pp. I-685 to I-688.

Vanhoucke, Vincent, "Confidence Scoring and Rejection Using Multi-Pass Speech Recognition", Nuance Communications, Menlo Park, CA, [no date], 4 pages.

Weng, Fuliang, et al., "Efficient Lattice Representation and Generation", Speech Technology and Research Laboratory, SRI International, Menlo Park, CA, [no date], 4 pages.

El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.

* cited by examiner

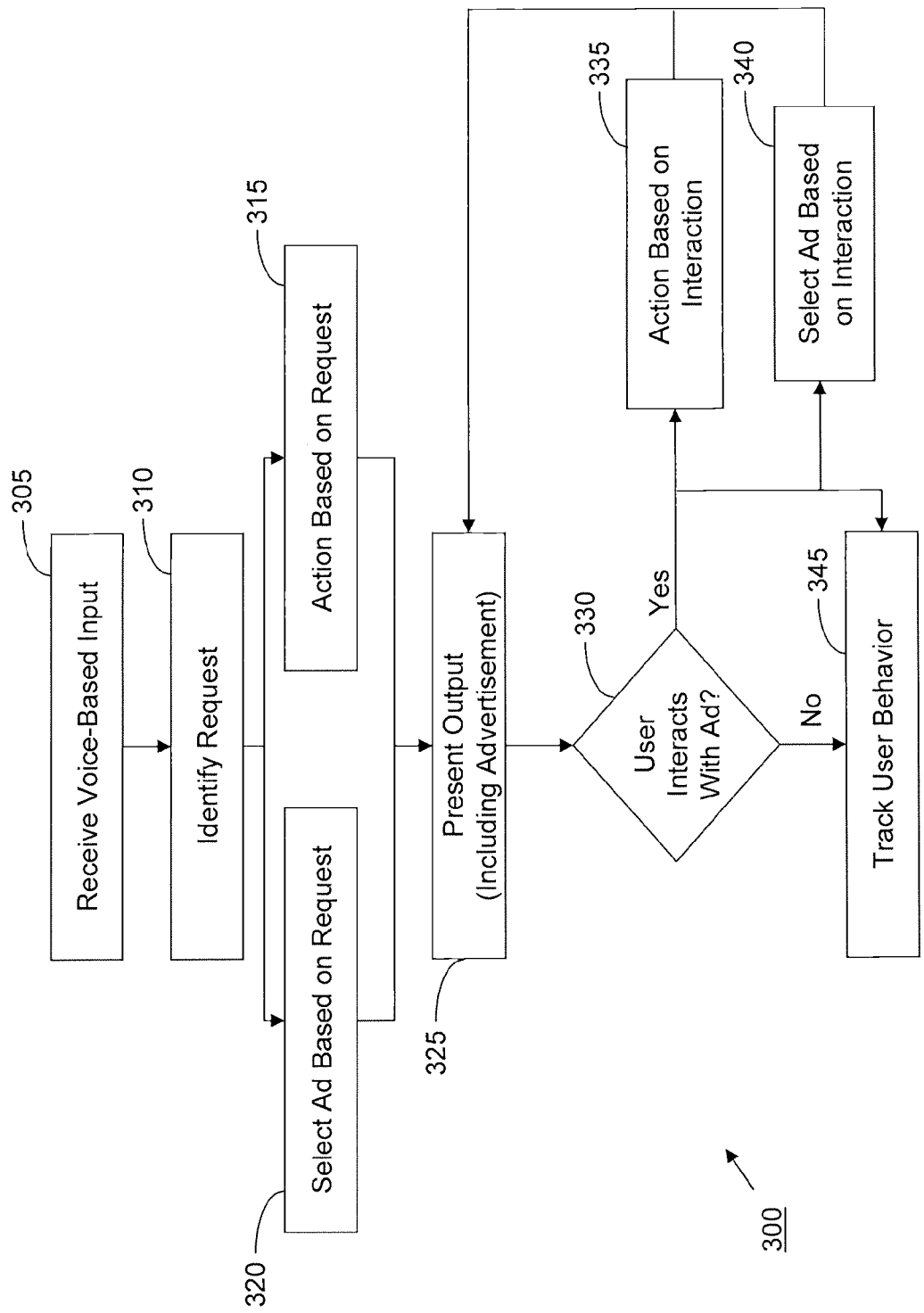

SYSTEM AND METHOD FOR SELECTING AND PRESENTING ADVERTISEMENTS BASED ON NATURAL LANGUAGE PROCESSING OF VOICE-BASED INPUT

FIELD OF THE INVENTION

The present invention relates to selecting and presenting advertisements based on natural language processing of voice-based input.

BACKGROUND OF THE INVENTION

As technology advances, consumer electronics devices tend to play larger roles due to increased functionality and mobility. For example, mobile phones, navigation devices, embedded devices, and other such devices provide a wealth of functionality beyond core applications. However, increased functionality adds difficulty to the learning curve associated with using electronic devices, and increased mobility intensifies the demand for simple mechanisms to interact with devices on the go. For example, existing systems tend to have complex human to machine interfaces, which may inhibit mass-market adoption for various technologies. For example, when a user wishes to perform a relatively simple task on a mobile phone, such as purchasing a ring tone, the user often is forced to navigate through a series of menus and press a series of buttons. In some instances, this may result in the transaction not necessarily occurring, as the user may prefer to avoid the hassles altogether. As such, there is ever-growing demand for ways to exploit technology in intuitive ways.

Voice recognition software may enable a user to exploit applications and features of a device that may otherwise be unfamiliar, unknown, or difficult to use. However, many existing voice user interfaces (when they actually work) still require significant learning on the part of the user. For example, users often cannot directly issue a request for a system to retrieve information or perform an action without having to memorize specific syntaxes, words, phrases, concepts, semantic indicators, or other keywords/qualifiers. Similarly, when users are uncertain of particular needs, many existing systems do not engage the user in a productive, cooperative dialogue to resolve requests and advance a conversation. Instead, many existing speech interfaces force users to use a fixed set commands or keywords to communicate requests in ways that systems can understand. Using existing voice user interfaces, there is virtually no option for dialogue between the user and the system to satisfy mutual goals.

The lack of adequate voice user interfaces results in missed opportunities for providing valuable and relevant information to users. Not only does this potentially leave user requests unresolved, in certain instances, providers of goods and services may lose out on potential business. In an increasingly global marketplace, where marketers are continually looking for new and effective ways to reach consumers, the problems with existing voice user interfaces leaves a large segment of consumer demand unfulfilled. Furthermore, existing techniques for marketing, advertising, or otherwise calling consumers to action fail to effectively utilize voice-based information, which is one of the most natural, intuitive methods of human interaction.

Existing systems suffer from these and other problems.

SUMMARY OF THE INVENTION

According to various aspects of the invention, a system and method for selecting and presenting advertisements based on natural language processing of voice-based inputs is provided. A natural language voice-based input may be received by a voice user interface. The voice-based input may include a user utterance, and a request may be identified from the utterance. Appropriate action may be taken to service the request, while one or more advertisements may be selected and presented to the user. Advertisements may be selected based on various criteria, including content of the input (e.g., concepts, semantic indicators, etc.), an activity related to the input (e.g., a relation to a request, a requested application, etc.), user profiles (e.g., demographics, preferences, location, etc.), or in other ways. A user may subsequently interact with the advertisement (e.g., via a voice-based input), and action may be taken in response to the interaction. Furthermore, the interaction may be tracked to build statistical profiles of user behavior based on affinities or clusters among advertisements, user profiles, contexts, topics, semantic indicators, concepts, or other criteria.

According to various aspects of the invention, advertisers may create advertisements, which may be stored in an advertisement repository. For example, advertisements may include sponsored messages, calls to action, purchase opportunities, trial downloads, or any other marketing communication, as would be apparent to those skilled in the art. Advertisers may specify various parameters to associate with the advertisements, such as various contexts or topic concepts (e.g., semantic indicators for a "music" concept may include words such as "music," "tunes," "songs," etc.), target demographics (e.g., a preferred audience), marketing criteria or prices for insertion (e.g., dynamic or static pricing based on various marketing criteria), or other information, as would be apparent. The advertisement repository may be associated with a server, where in response to a voice-based input from a user (e.g., at a voice-enabled device), a communications link may be established with the server. Information may be extracted from the voice-based input (e.g., words in the input, applications requested by the input, etc.), and the extracted information may be correlated with user profiles, advertisement parameters, or other information to determine which advertisements to select in relation to the voice-based input. The server may subsequently communicate the selected advertisements to the user, and the server may track the user's subsequent interaction with the selected advertisements.

Other objects and advantages of the invention will be apparent based on the following drawings and detailed description.

BRIEF DESCRIPTION OF THE DRAWINGS

FIG. 3 illustrates a flow diagram of an exemplary method for selecting and presenting advertisements based on voice-based inputs according to various aspects of the invention.

DETAILED DESCRIPTION

Figure 1:
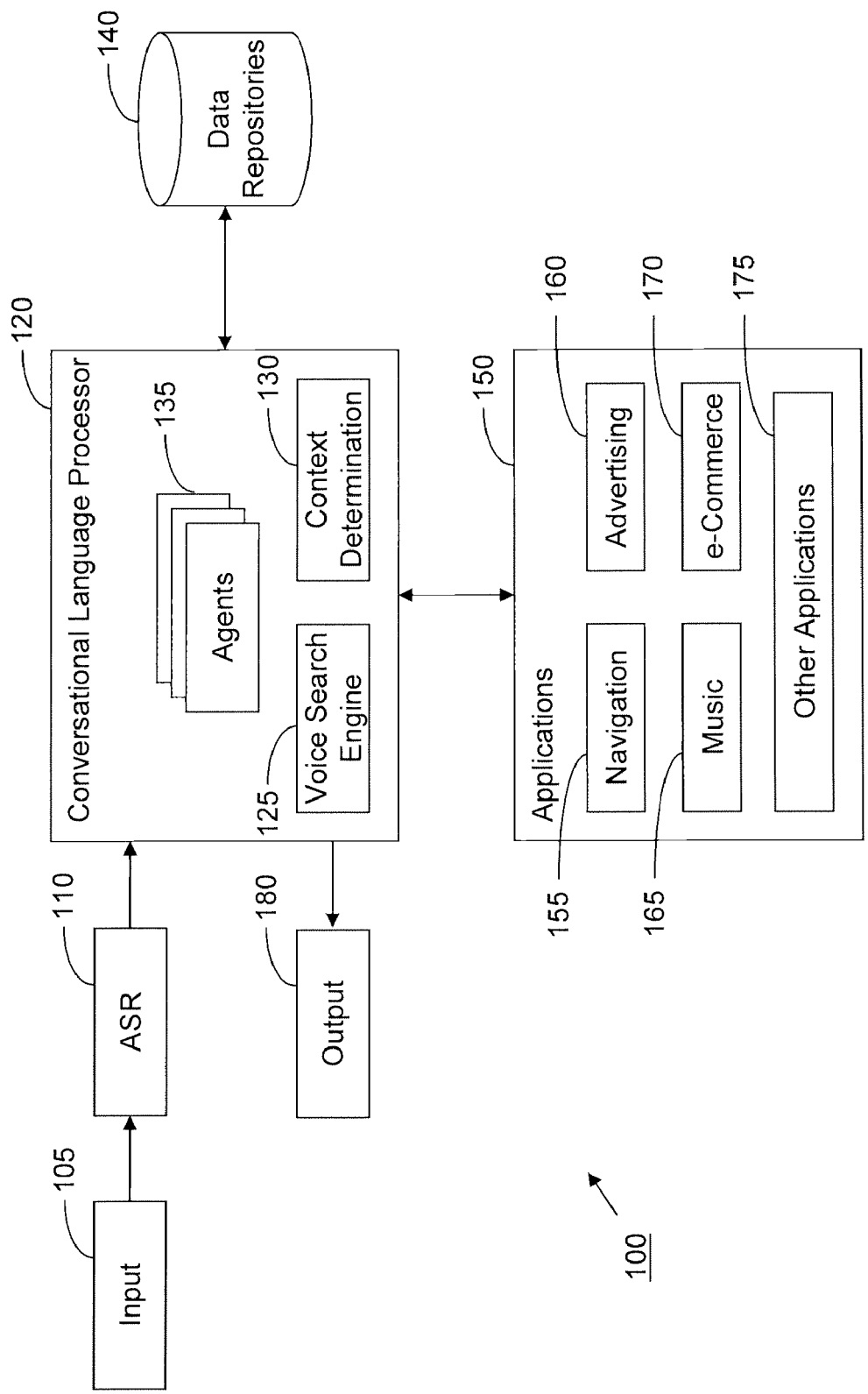
FIG. 1 illustrates a block diagram of an exemplary system for implementing a voice user interface according to various aspects of the invention.

Referring to FIG. 1, an exemplary system 100 for implementing a voice user interface is illustrated according to various aspects of the invention. System 100 may enable users to perform various tasks on a voice-enabled device. For example, users may control navigation devices, media devices, personal computers, personal digital assistants, or any other device supporting voice-based inputs. System 100 may enable users to request voice-enabled devices to retrieve information or perform various tasks, among other things, using natural language voice-based inputs. For example, system 100 may interpret natural language voice-based inputs and generate responses using, among other things, techniques described in U.S. patent application Ser. No. 10/452,147, entitled "Systems and Methods for Responding to Natural Language Speech Utterance," filed Jun. 3, 2003, which issued as U.S. Pat. No. 7,398,209 on Jul. 8, 2008, and U.S. patent application Ser. No. 10/618,633, entitled "Mobile Systems and Methods for Responding to Natural Language Speech Utterance," filed Jun. 15, 2003, which issued as U.S. Patent No. 7,693,720 on Apr. 6, 2010, both of which are hereby incorporated by reference in their entirety. For example, as described in U.S. patent application Ser. No. 10/452,147, the system 100 may include a speech recognition engine (e.g., an Automatic Speech Recognizer 110) that may recognize words and phrases in an utterance using entries in one or more dictionary and phrase tables. In addition, as further described therein, fuzzy set possibilities or prior probabilities for the words in the dictionary and phrase tables may be dynamically updated to maximize the probability of correct recognition at each stage of the dialog (e.g., the probabilities or possibilities may be dynamically updated based on application domains, questions or commands, contexts, user profiles and preferences, user dialog histories, recognizer dictionary and phrase tables, word spellings, and/or other criteria).

According to various aspects of the invention, system 100 may receive a user input, including at least a voice-based user utterance, at an input device 105. Input device 105 may include any suitable device, or combination of devices, for receiving a voice-based input (e.g., a microphone). In various implementations, input device 105 may include a multi-modal input, such as a touch-screen interface, keypad, or other input. The received utterance may be processed by the Automatic Speech Recognizer 110. Automatic Speech Recognizer 110 may generate one or more preliminary interpretations of the utterance using various techniques. For example, Automatic Speech Recognizer 110 may interpret the utterance using techniques of phonetic dictation to recognize a stream of phonemes. Further, Automatic Speech Recognizer 110 may perform post-processing to enhance the preliminary interpretations. For example, Automatic Speech Recognizer 110 may vary interpretations of an utterance, or components of an utterance, from one context to another. Other techniques for enhancing an interpretation of a user utterance may be used, such as those described in U.S. patent application Ser. No. 11/513,269, entitled "Dynamic Speech Sharpening," filed Aug. 31, 2006, which issued as U.S. Pat. No. 7,634,409 on Dec. 15, 2009, and which is hereby incorporated by reference in its entirety.

The one or more preliminary interpretations may be provided to a conversational language processor 120. Conversational language processor 120 may include a voice search engine 125, a context determination module 130, and one or more agents 135, among other things, to enable cooperative, conversational interaction between the user and system 100. Conversational language processor 120 may be communicatively coupled to one or more data repositories 140 and one or more applications 150. Conversational language processor 120 may generate a domain-specific conversational response, which may be returned to the user as an output 180. Output 180 may include a multi-modal output (e.g., by simultaneously returning a voice-based response and displaying information on a display device).

System 100 may further include an interaction with one or more applications 150 to service one or more requests in the utterance. For example, the utterance may include one or more requests for performing an action, retrieving information, or various combinations thereof. Output 180 may include a conversational response to advance a conversation to service requests by invoking one or more applications 150, as appropriate. For example, applications 150 may include a navigation application 155, an advertising application 160, a music application, an electronic commerce application 170, and/or other applications 175. Furthermore, Automatic Speech Recognizer 110, conversational language processor 120, data repositories 140, and/or applications 150 may reside locally (e.g., on a user device), remotely (e.g., on a server), and/or hybrid local/remote processing models may be used (e.g., lightweight applications may be processed locally while computationally intensive applications may be processed remotely).

Conversational language processor 120 may build long-term and/or short-term shared knowledge in one or more knowledge source. For example, shared knowledge sources may include information about previous utterances, requests, and other user interactions to inform generating an appropriate response to a current utterance. The shared knowledge may include public/non-private (i.e., environmental) knowledge, as well as personal/private (i.e., historical) knowledge. For example, conversational language processor 120 may use context determination module 130 to establish a context for a current utterance by having domain agents 135 competitively generate a context-based interpretation of the utterance (e.g., by scoring possible interpretations and selecting a highest scoring interpretation). As such, agents 135 may model various domains (e.g., navigation, music, a specific user, global users, advertising, e-commerce, etc.), and conversational language processor 120 may interpret and/or respond to a voice-based input accordingly. For example, context-based interpretations and responses to a voice-based input may be generated using techniques described in U.S. patent application Ser. No. 11/197,504, entitled "Systems and Methods for Responding to Natural Language Speech Utterance," filed Aug. 5, 2005, which issued as U.S. Pat. No. 7,640,160 on Dec. 29, 2009, and U.S. patent application Ser. No. 11/212,693, entitled "Mobile Systems and Methods of Supporting Natural Language Human-Machine Interactions," filed Aug. 29, 2005, both of which are hereby incorporated by reference in their entirety.

Furthermore, conversational language processor 120 may support adaptive misrecognition to reinterpret a current utterance and/or one or more previous utterances. For example, information contained in a current utterance may indicate that interpretations for one or more previous utterances were incorrect, and therefore, the previous utterances may be reinterpreted to improve subsequent interpretations. Accordingly, conversational language processor 120 may use the techniques described herein, along with various other techniques, to interpret and respond to conversational, natural language utterances. Conversational language processor 120 may use various other techniques as will be apparent, such as those described in U.S. patent application Ser. No. 11/200,164, entitled "System and Method of Supporting Adaptive Misrecognition in Conversational Speech," filed Aug. 10, 2005, which issued as U.S. Pat. No. 7,620,549 on Nov. 17, 2009, and U.S. patent application Ser. No. 11/580,926, entitled "System and Method for a Cooperative Conversational Voice User Interface," filed Oct. 16, 2006, both of which are hereby incorporated by reference in their entirety. For example, as described in U.S. patent application Ser. No. 11/200,164, an environmental model may be accessed to determine user location, user activity, track user actions, and/or other environmental information to invoke context, domain knowledge, preferences, and/or other cognitive qualities to enhance the interpretation of questions and/or commands. In addition, as further described therein, based on information received from a general cognitive model, the environmental model, and/or a personalized cognitive model, which provide statistical abstracts of user interaction patterns, the system 100 may enhance responses to commands and questions by including a prediction of user behavior.

Figure 2:
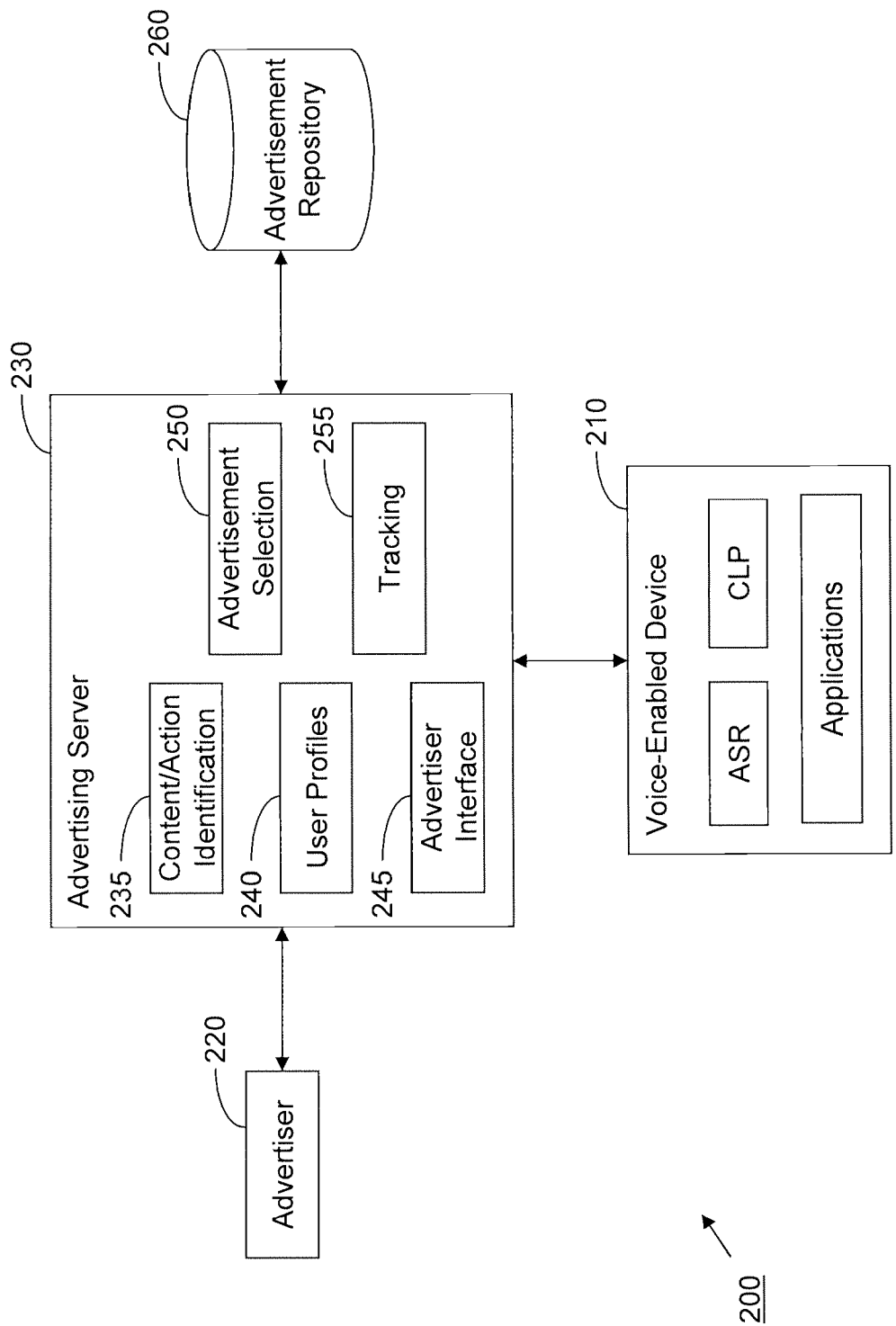
FIG. 2 illustrates a block diagram of an exemplary advertising system according to various aspects of the invention.

Referring to FIG. 2, an exemplary advertising system 200 is illustrated according to various aspects of the invention. System 200 may include a server 230 for receiving one or more advertisements from an advertiser 220, wherein the advertisements may be stored in a data repository 260 associated with server 230. For example, advertisements may include sponsored messages or marketing communications, calls to action, purchase opportunities, trial downloads, coupons, or any other suitable marketing, advertising, campaign, or other information, as would be apparent to those skilled in the art. A voice-enabled device 210 may receive a voice-based input and establish communications with advertising server 230. Subsequently, advertising server 230 may select one or more advertisements from among the advertisements stored in data repository 260, and the selected advertisements may be provided to the voice-enabled device for presentation to a user.

Advertiser 220 may access advertising server 230 via an advertiser interface 245. Advertisers 220 may upload targeted advertisements to server 230 via advertiser interface 245, and server 230 may store the advertisements in data repository 260. The advertisements may include graphically-based advertisements that include banners, images, audio, video, or any suitable combination thereof. Furthermore, the advertisements may include interactive or embedded information, such as links, metadata, or computer-executable instructions, or any suitable combination thereof. Advertisers may specify criteria for a campaign or targeting information for an advertisement (e.g., a start date, an end date, budget information, geo-targeting information, conceptual or contextual information, or any other suitable criteria), which may be used to facilitate selecting an advertisement in relation to a particular voice-based input.

In addition to providing interface 245 for advertisers, server 230 may include a content/action identification module 235, a user profile module 240, an advertisement selection module 250, and a tracking module 255. Users may submit voice-based requests to voice-enabled device 210, and voice-enabled device 210 may communicate information about the voice-based input to server 230. Server 230 may invoke advertisement selection module 250 to extract relevant information from about the voice-based input, where advertisement selection module 250 may select one or more advertisements relevant to the voice-based input based on information extracted using content/action identification module 235 and/or user profile module 240.

For example, content/action identification module 235 may identify content of the voice-based input (e.g., words in the input), requested information (e.g., search results, a web page, music, video, graphics, or other information), requested actions (e.g., calculating a navigation route, placing a telephone call, playing a song, etc.), a category or topic related to the input (e.g., music, business, stocks, sports, navigation, movies, etc.), or other criteria to use in selecting an advertisement. Further, user profile module 240 may identify characteristics of a specific user (e.g., demographics, personal preferences, location-based information, etc.), global user profiles (e.g., demographic profiles, click-through rates, etc.), or other criteria to use in selecting an advertisement. Moreover, advertisement selection module 250 may account for where a request originates from. For example, advertisements may be selected based on a default user location (e.g., identified from a user profile), current geolocation information (e.g., identified from a navigation device), whether an affiliate or partner of server 230 initiated the request, or other criteria.

For instance, a user may request airline reservations via voice-enabled device 210, and content/action identification module 235 may identify specific words used in the request, a category related to the request (e.g., travel, airlines, hotels, etc.), or other information. Furthermore, user profile module 240 may identify relevant characteristics of the user (e.g., user-specific demographics, location information, preferred airlines or hotels, etc.), as well as global user characteristics (e.g., most popular airlines). In various implementations, advertisements may be selected by assigning a score to each advertisement (e.g., based on click-through rates, relevance metrics, target audiences, etc.). As such, advertisement selection module 250 may correlate the information about the request to select advertisements stored in data repository 260, and server 230 may communicate the selected advertisements to voice-enabled device 210. Furthermore, selected advertisements may be presented according to a predetermined ordering or ranking (e.g., based on a ranking of relevance to an advertisement).

In various implementations, advertisement selection module 250 may retrieve a predetermined number of advertisements for any given request. Furthermore, the selected advertisements may depend upon a presentation format. For example, advertisements may be selected based on an amount of available space on a display of voice-enabled device 210 and/or a size/shape of the selected advertisements. In another example, voice-based advertisements may be selected and presented to the user audibly (e.g., a "hands-free" advertisement may be preferred when voice-enabled device 210 is a telematics device).

Furthermore, the user's subsequent interaction with an advertisement may be tracked using tracking module 255. For example, tracking module 255 may determine whether a conversion or click-through occurs for each advertisement presented to users. Further, tracking module 255 may maintain accounting and/or billing information associated with advertisers 220. For example, advertisers 220 may specify a maximum insertion cost, a cost-per-click-through, an average insertion cost, or other criteria specifying a budget constraint for an advertisement. As such, tracking module 255 may track which advertisements are selected and/or presented, which advertisements result in a conversion or click-through, whether a click-through or conversion results in a transaction or sale, associations between advertisements and users, requests, concepts, semantic indicators, and/or other criteria. For example, tracking user interaction with advertisements may be used to build user-specific and/or global statistical profiles that map or cluster advertisements to topics, semantic indicators, contexts, concepts, etc. based on user behavior, demographics, targeting constraints, content of advertisements, content of requests, actions associated with requests, or other statistically relevant information. Accordingly, the tracking information may be used to bill or invoice advertisers 220, as well as to improve subsequent performance and relevance of advertisements selected using advertisement selection module 250. Other techniques and features of selecting and presenting advertisements based on voice-based inputs may suitably be employed, as would be apparent.

Referring to FIG. 3, an exemplary method for selecting and presenting advertisements based on a voice-based input is illustrated according to various aspects of the invention. The method may begin in an operation 305, where a voice-based input, including at least a user utterance, may be received at a voice user interface. The voice user interface may include any suitable mechanism for receiving the utterance (e.g., a microphone), and may interface with any suitable voice-enabled device, as would be apparent, including personal navigation devices, personal digital assistants, media devices, telematics devices, personal computers, mobile phones, or others.

Subsequently, one or more requests included in the voice-based input may be identified in an operation 310. For example, the requests may include requests to retrieve information, perform tasks, explore or gather information, or otherwise interact with a system or device. For example, a voice-based input to a navigation device may include a request to calculate a route or retrieve location-based information. In another example, a voice-based input to a mobile phone may include a request to place a telephone call, purchase a ringtone, or record a voice-memo. Furthermore, in various implementations, voice-based inputs may include multiple requests, multi-modal requests, cross-device requests, cross-application requests, or other types of requests. For example, an utterance received in operation 305 may be: "Get me a route to Chang's Restaurant, and call them so I can make a reservation." The utterance may thus include multiple requests, including cross-device requests (e.g., calculate a route using a navigation device, and make a telephone call using a mobile phone), as well as cross-application requests (e.g., search for an address and/or phone number using a voice search engine, and calculate a route using a navigation application).

The requests may be part of a conversational interaction between a user and a system or device, whereby an interpretation of requests in a current utterance may be based upon previous utterances in a current conversation, utterances in previous conversations, context-based information, local and/or global user profiles, or other information. For example, a previous request may be reinterpreted based on information included in subsequent requests, a current request may be interpreted based on information included in previous requests, etc. Furthermore, the conversational interaction may take various forms, including query-based conversations, didactic conversations, exploratory conversations, or other types of conversations. For example, the conversational language processor may identify a type of conversation, and information may be extracted from the utterance accordingly to identify the one or more requests in operation 310. Moreover, the conversational language processor may determine whether any of the requests are incomplete or ambiguous, and .action may be taken accordingly (e.g., a system response may prompt a user to clarify an incomplete and/or ambiguous request). The conversational language processor may therefore use various techniques to identify a conversation type, interpret utterances, identify requests, or perform other tasks, such as those described in the aforementioned U.S. Patent Applications and U.S. Patents, which are hereby incorporated by reference in their entirety.

Upon identifying the one or more requests, action may be taken based on the identified requests in an operation 315, while one or more advertisements may be selected in an operation 320 (described in greater detail below). For example, one or more context-appropriate applications may be invoked to service the requests in operation 315 (e.g., a voice search engine, a navigation application, an electronic commerce application, or other application may be invoked depending upon the request). Furthermore, in operation 320, information may be communicated to an advertising server to select one or more advertisements related to the request. Thus, as shown in FIG. 3, taking action in operation 315 and selecting advertisements in operation 320 may be related operations (e.g., advertisements may be selected to help in interpreting incomplete and/or ambiguous requests).

Upon taking action in operation 315 (e.g., to service the request) and selecting one or more advertisements in operation 320 (e.g., in relation to the request), an output may be presented to the user in operation 325. The output may indicate a result of the action associated with operation 315. For example, the output may include requested information, an indication of whether a requested task was successfully completed, whether additional information is needed to service the request (e.g., including a prompt for the information), or other information relating to an action based on the request. Furthermore, the output may include advertisements, as selected in operation 320. For example, the output may include text-based, graphic-based, video-based, audio-based, or other types of advertisements, as would be apparent to those skilled in the art. Further, the output may include other types of advertisements, including calls to action (e.g., a location-based coupon or purchase opportunity, trial downloads, or other actionable advertising or marketing).

Advertisements may be selected in relation to a request based on various criteria. For example, an advertisement may be selected based on words or other content of the request, relevant words or content related to the words or content of the request, etc. In another example, the advertisement may be selected based on requested tasks/information (e.g., a request for movie showtimes may result in an advertisement being selected for a particular theater). In yet another example, the advertisement may be selected based on a topic or category associated with the requested tasks/information (e.g., a request to purchase airline tickets may result in an advertisement being selected for a hotel in a destination associated with a reserved flight). In still other examples, the advertisement may be selected based on location information, (e.g., advertisements may be selected based on a proximity to a user geolocation identified using a navigation device), user-specific and/or global user profiles (e.g., advertisements may be selected based on user-specific and/or global preferences, advertiser campaign criteria, etc.).

Content of a voice-based input may be determined based on various criteria, including contextual or conceptual information (e.g., semantic indicators, qualifiers, or other information). For example, a given concept may include various semantically equivalent indicators having an identical meaning. Thus, for instance, a voice-based input may be "Play some tunes!" or "Play some music!" or other variants thereof, each of which may be interpreted as relating to a specific idea (or concept) of "Music." Thus, concept or content information in a request may be used to select an advertisement. For example, a user may request to calculate a route in Seattle, Wash. (e.g., "How do I get to the Space Needle?"). Based on a context of the requested task (e.g., "Navigation," "Seattle," etc.), a voice search engine may retrieve an address of the Space Needle and a navigation application may calculate the route. Furthermore, user profile information may indicate that the user is visiting Seattle from out-of-town (e.g., the profile may indicate that the user's home is Sacramento), and therefore, an advertisement for popular points-of-interest in Seattle may be selected. In another example, the user may request information about a sporting event (e.g., "Get me the kickoff time for the Eagles game on Sunday"). Based on a context of the requested information (e.g., "Search," "Sports," "Philadelphia," etc.), the requested information may be retrieved, while an advertisement for Eagles apparel or memorabilia may be selected.

In various instances, concepts, semantic indicators, qualifiers, or other information included in, or inferred from, a request may indicate an exploratory nature for the request. In other words, the exploratory request may identify a goal for a conversation, instead of a particular task to perform or information to retrieve. As such, in various implementations, an advertisement may be selected in operation 320 in an effort to advance the conversation towards the goal. For example, an exploratory request may include a request for a navigation route (e.g., "I feel like going to a museum, find me something interesting"). Based on a context of the requested task (e.g., "Navigation," "Points of Interest," etc.), the goal of the conversation may be identified, and the request may be serviced in operation 315 (e.g., a voice search engine may locate nearby points of interest based on user preferred topics). Further, the advertising application may select an appropriate advertisement in operation 320, where the advertisement may be selected in an attempt to advance the conversation towards the goal. For example, statistical profiles (e.g., user profiles, global profiles, topic-based profiles, etc.) may reflect an affinity between an advertisement for a particular museum and other users sharing similar demographics or other characteristics with the requesting user. Thus, in addition to retrieving information about museums in operation 315, an advertisement for a museum likely to be of interest to the user may be selected in operation 320.

In various instances, a request may include incomplete, ambiguous, unrecognized, or otherwise insufficient semantic indicators, context, qualifiers, or other information needed to identify the request. In other words, the request may include inadequate information to identify or infer a task to perform, information to retrieve, or a goal for a conversation. Thus, as much information as possible may be extracted and/or inferred from the request based on shared knowledge such as context, user or global profile information, previous utterances, previous conversations, etc. As such, servicing the request may include generating a response and/or communicating with an advertising application to advance a conversation toward a serviceable request. For example, servicing the request in operation 315 and selecting an advertisement in operation 320 may include generating a response and/or selecting an advertisement to frame a subsequent user input, thereby advancing the conversation.

For example, the request may include incomplete, ambiguous, or unrecognized information (e.g., "Do you know [mumbled words] Seattle?"). A context of the requested task may be identified (e.g., "Seattle"), yet the identified context may be insufficient to adequately take action to service the request. Additional information may be inferred based on previous utterances in the conversation, profile information, or other information. However, when the additional information fails to provide adequate information to infer a reasonable hypothesis, servicing the request in operation 315 may include generating a response to frame a subsequent user input and advance the conversation (e.g., information about various topics may be retrieved based on a user's preferred topics). Further, the advertising application may select an advertisement in operation 320 to advance the conversation (e.g., advertisements may be selected based on user and/or global profiles reflecting an affinity between certain advertisements associated with Seattle and user preferences, profiles, etc.). Thus, by selecting an advertisement, indicating dissatisfaction with an advertisement, or otherwise interacting with an advertisement, the interaction may be used to build context and shared knowledge for a subsequent course of the conversation. For example, a user may select an advertisement, and an interpretation of a subsequent voice-based input (e.g., "Call them," "What's the price range?" etc.) may be interpreted with shared knowledge of the advertisement that the voice-based input relates to. Thus, advertisements may be used in a way that enables advertisers to market to consumers, while also improving the consumers' interaction with a device. Other advantages will be apparent to those skilled in the art.

It will be apparent that operation 320 may use various techniques to select advertisements based on voice-based inputs and/or requests included therein. For example, an advertiser may specify a target audience, marketing criteria, campaign strategies, budget constraints, concepts, semantic indicators, related topics, categories, and/or any other suitable information to associate with an advertisement. For instance, advertisers may pay a premium to prioritize an advertisement in relation to similar advertisements (e.g., advertisements associated with competitors). In another example, various statistical profiles may define affinities between advertisements, topics, users, etc. (e.g., based on click-through or conversion rates, or other tracking information, as described in more detail below). Thus, advertisements may be selected in operation 320 using various techniques, including content of the request, an activity/action associated with the request, user profiles, user preferences, statistical metrics, advertiser-specified criteria, to advance a conversation, to resolve ambiguous requests, or in various other ways, as will be apparent.

The output presented to the user in operation 325 may be provided to the user in various ways. For example, in various implementations, the output may include a voice-based or otherwise audible response. In another example, when an associated device includes a display mechanism, the output may be displayed on the display device. It will be apparent that many combinations or variants thereof may be used, such as augmenting a voice-based response with information on a display device. For example, a user may request information about restaurants, and an advertisement may be selected based on a user preference indicating a favorite type of restaurant (e.g., a Chinese restaurant may be selected based on a user profile indicating a preference for Chinese). Therefore, in one example, the output presented in operation 325 may display information about various restaurants matching the requested information, while a voice-based advertisement for the Chinese restaurant may be played to the user (e.g., via a speaker or other suitable mechanism for playing voice back to the user). Many other variations will be apparent (e.g., a graphical advertisement may be displayed on a display device, while a corresponding or different voice-based advertisement may be played audibly).

Subsequent interaction between the user and the presented advertisements may be monitored in a decisional operation 330. For instance, when the user elects to interact with the advertisement, action may be taken based on the interaction in an operation 335. The interaction may take various forms, including additional voice-based inputs or other suitable mechanisms for interacting with advertisements (e.g., clicking on an advertisement displayed on a personal digital assistant using an associated stylus). For example, a user may initially request information from a voice-enabled media device (e.g., a satellite radio player) about a song currently playing (e.g., "What is this song?"). In addition to outputting the requested information about the song (e.g., "This song is Double Barrel by Dave and Ansel Collins."), a selected advertisement may enable the user to purchase a ringtone for a mobile phone that corresponds to the song. In this example, the interaction may include a request to purchase the ringtone (e.g., "Yeah, I'll buy that"), and action taken in operation 335 may include completing a transaction for the ringtone and/or downloading the ringtone to the mobile phone. Furthermore, additional advertisements may be selected in an operation 340 based on the interaction, using similar techniques as described in connection with operation 320 (e.g., advertisements for additional ringtones, similar musicians, etc. may be selected). Processing may subsequently return to operation 325 to present output resulting from the interaction.

User advertisement interaction may be tracked in an operation 345. For example, operation 345 may track historical data about users, conversations, topics, contexts, or other criteria to associate information with the selected advertisement. The tracking information may therefore be used to build statistical profiles defining affinities, click-through or conversion rates, or other information about various advertisements, topics, or other criteria on a user-specific and/or a global-user level. Thus, clusters or mappings may be created between advertisements, topics, concepts, demographics, or other criteria based on user behavior with the advertisements (e.g., whether a user interacts with the advertisement in operation 330).

For instance, certain advertisements may experience high click-through rates in relation to a first context and/or topic, but low click-through rates in relation to a second context and/or topic, and therefore, when requests relate to the first context and/or topic, the advertisement may be more likely to be selected in subsequent operations 320/340. In another example, global statistical profiles may indicate that an advertisement experiences more click-throughs by users of a particular demographic, and therefore, the advertisement may be more likely to be selected for users falling within the demographic. Many different techniques for tracking and building statistical profiles will be apparent.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be apparent to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for selecting and presenting advertisements in response to processing natural language utterances, comprising:
   receiving a natural language utterance containing at least one request at an input device;
   recognizing one or more words or phrases in the natural language utterance at a speech recognition engine coupled to the input device, wherein recognizing the words or phrases in the natural language utterance includes:
     mapping a stream of phonemes contained in the natural language utterance to one or more syllables that are phonemically represented in an acoustic grammar; and
     generating a preliminary interpretation for the natural language utterance from the one or more syllables, wherein the preliminary interpretation generated from the one or more syllables includes the recognized words or phrases;
   interpreting the recognized words or phrases at a conversational language processor coupled to the speech recognition engine, wherein interpreting the recognized words or phrases includes establishing a context for the natural language utterance;
   selecting an advertisement in the context established for the natural language utterance; and
   presenting the selected advertisement via an output device coupled to the conversational language processor.

2. The method of claim 1, wherein the conversational language processor selects the advertisement based on information related to one or more of the recognized words or phrases, an action associated with the request, a personalized cognitive model derived from an interaction pattern for a specific user, a generalized cognitive model derived from an interaction pattern for a plurality of users, or an environmental model derived from environmental conditions or surroundings associated with the specific user.

3. The method of claim 2, further comprising:
   tracking an interaction pattern with the advertisement presented via the output device; and
   updating one or more of the personalized cognitive model, the generalized cognitive model, or the environmental model based on the interaction pattern tracked for the advertisement.

4. The method of claim 3, wherein updating one or more of the personalized cognitive model, the generalized cognitive model, or the environmental model builds statistical profiles for selecting subsequent advertisements in response to subsequent natural language utterances.

5. The method of claim 4, wherein the statistical profiles identify affinities between the advertisement presented via the output device and one or more of the recognized words or phrases, the action associated with the request, the personalized cognitive model, the generalized cognitive model, or the environmental model.

6. The method of claim 3, further comprising:
   building long-term shared knowledge and short-term shared knowledge in response to updating one or more of the personalized cognitive model, the generalized cognitive model, or the environmental model;
   receiving a subsequent natural language utterance at the input device; and interpreting the subsequent natural language utterance at the conversational language processor using the long-term shared knowledge and the short-term shared knowledge.

7. The method of claim 3, wherein the interaction pattern tracked for the advertisement includes an action performed in response to a subsequent request that identifies the advertisement.

8. The method of claim 7, wherein the action includes executing a task or retrieving information based on the subsequent request that identifies the advertisement.

9. The method of claim 1, wherein the conversational language processor selects the advertisement to resolve the request in response to determining that the natural language utterance includes incomplete or ambiguous information.

10. The method of claim 1, wherein the speech recognition engine recognizes the one or more words or phrases in the natural language utterance using a plurality of entries in one or more dictionary and phrase tables that are dynamically updated based on a history of a current dialog and one or more prior dialogs.

11. The method of claim 10, wherein the plurality of entries in the one or more dictionary and phrase tables are further dynamically updated based on one or more dynamic fuzzy set possibilities or prior probabilities derived from the history of the current dialog and the prior dialogs.

12. The method of claim 1, further comprising determining that the conversational language processor incorrectly interpreted the words or phrases in response to an adaptive misrecognition engine detecting a predetermined event, wherein the conversational language processor reinterprets the words or phrases in response to the predetermined event.

13. The method of claim 12, wherein the predetermined event includes receiving one or more of a subsequent input proximate in time to the natural language utterance, a subsequent input that stops the conversational language processor from processing the request contained in the natural language utterance, a subsequent input that overrides the request in a time shorter than an expected time to process the request, or a subsequent input that repeats the natural language utterance.

14. A method for selecting and presenting advertisements in response to processing natural language utterances, comprising:
receiving a natural language utterance containing at least one request at an input device;
recognizing one or more words or phrases in the natural language utterance at a speech recognition engine coupled to the input device;
interpreting the recognized words or phrases at a conversational language processor coupled to the speech recognition engine, wherein interpreting the recognized words or phrases includes establishing a context for the natural language utterance;
selecting an advertisement in the context established for the natural language utterance;
presenting the selected advertisement via an output device coupled to the conversational language processor; and
determining that the conversational language processor incorrectly interpreted the words or phrases in response to an adaptive misrecognition engine detecting a predetermined event, wherein the conversational language processor reinterprets the words or phrases in response to the predetermined event.

15. The method of claim 14, wherein the predetermined event includes receiving one or more of a subsequent input proximate in time to the natural language utterance, a subsequent input that stops the conversational language processor from processing the request contained in the natural language utterance, a subsequent input that overrides the request in a time shorter than an expected time to process the request, or a subsequent input that repeats the natural language utterance.

16. The method of claim 14, wherein recognizing the words or phrases in the natural language utterance includes:
mapping a stream of phonemes contained in the natural language utterance to one or more syllables that are phonemically represented in an acoustic grammar; and
generating a preliminary interpretation for the natural language utterance from the one or more syllables, wherein the preliminary interpretation generated from the one or more syllables includes the recognized words or phrases.

17. The method of claim 14, wherein the conversational language processor selects the advertisement to resolve the request in response to determining that the natural language utterance includes incomplete or ambiguous information.

18. The method of claim 14, wherein the conversational language processor selects the advertisement based on information related to one or more of the recognized words or phrases, an action associated with the request, a personalized cognitive model derived from an interaction pattern for a specific user, a generalized cognitive model derived from an interaction pattern for a plurality of users, or an environmental model derived from environmental conditions or surroundings associated with the specific user.

19. The method of claim 18, further comprising:
tracking an interaction pattern with the advertisement presented via the output device; and
updating one or more of the personalized cognitive model, the generalized cognitive model, or the environmental model based on the interaction pattern tracked for the advertisement.

20. The method of claim 19, wherein updating one or more of the personalized cognitive model, the generalized cognitive model, or the environmental model builds statistical profiles for selecting subsequent advertisements in response to subsequent natural language utterances.

21. The method of claim 20, wherein the statistical profiles identify affinities between the advertisement presented via the output device and one or more of the recognized words or phrases, the action associated with the request, the personalized cognitive model, the generalized cognitive model, or the environmental model.

22. The method of claim 19, further comprising:
building long-term shared knowledge and short-term shared knowledge in response to updating one or more of the personalized cognitive model, the generalized cognitive model, or the environmental model;
receiving a subsequent natural language utterance at the input device; and
interpreting the subsequent natural language utterance at the conversational language processor using the long-term shared knowledge and the short-term shared knowledge.

23. The method of claim 19, wherein the interaction pattern tracked for the advertisement includes an action performed in response to a subsequent request that identifies the advertisement.

24. The method of claim 23, wherein the action includes executing a task or retrieving information based on the subsequent request that identifies the advertisement.

25. The method of claim 14, wherein the speech recognition engine recognizes the one or more words or phrases in the natural language utterance using a plurality of entries in one or more dictionary and phrase tables that are dynamically updated based on a history of a current dialog and one or more prior dialogs.

26. The method of claim 25, wherein the plurality of entries in the one or more dictionary and phrase tables are further dynamically updated based on one or more dynamic fuzzy set possibilities or prior probabilities derived from the history of the current dialog and the prior dialogs.

27. A system for selecting and presenting advertisements in response to processing natural language utterances, comprising:
   an input device that receives a natural language utterance containing at least one request at an input device;
   a speech recognition engine coupled to the input device, wherein the speech recognition engine recognizes one or more words or phrases in the natural language utterance, wherein to recognize the words or phrases in the natural language utterance, the speech recognition engine is configured to:
      map a stream of phonemes contained in the natural language utterance to one or more syllables that are phonemically represented in an acoustic grammar; and
      generate a preliminary interpretation for the natural language utterance from the one or more syllables, wherein the preliminary interpretation generated from the one or more syllables includes the recognized words or phrases;
   a conversational language processor coupled to the speech recognition engine, wherein the conversational language processor is configured to:
      interpret the recognized words or phrases, wherein interpreting the recognized words or phrases includes establishing a context for the natural language utterance;
      select an advertisement in the context established for the natural language utterance; and
      present the selected advertisement via an output device.

28. The system of claim 27, wherein the conversational language processor selects the advertisement based on information related to one or more of the recognized words or phrases, an action associated with the request, a personalized cognitive model derived from an interaction pattern for a specific user, a generalized cognitive model derived from an interaction pattern for a plurality of users, or an environmental model derived from environmental conditions or surroundings associated with the specific user.

29. The system of claim 28 wherein the conversational language processor is further configured to:
   track an interaction pattern with the advertisement presented via the output device; and
   update one or more of the personalized cognitive model, the generalized cognitive model, or the environmental model based on the interaction pattern tracked for the advertisement.

30. The system of claim 29, wherein the conversational language processor updates one or more of the personalized cognitive model, the generalized cognitive model, or the environmental model to build statistical profiles for selecting subsequent advertisements in response to subsequent natural language utterances.

31. The system of claim 30, wherein the statistical profiles identify affinities between the advertisement presented via the output device and one or more of the recognized words or phrases, the action associated with the request, the personalized cognitive model, the generalized cognitive model, or the environmental model.

32. The system of claim 29, wherein the conversational language processor is further configured to:
   build long-term shared knowledge and short-term shared knowledge in response to updating one or more of the personalized cognitive model, the generalized cognitive model, or the environmental model; and
   interpret a subsequent natural language utterance received at the input device language processor using the long-term shared knowledge and the short-term shared knowledge.

33. The system of claim 29, wherein the interaction pattern tracked for the advertisement includes an action performed in response to a subsequent request that identifies the advertisement.

34. The system of claim 33, wherein the action includes executing a task or retrieving information based on the subsequent request that identifies the advertisement.

35. The system of claim 27, wherein the conversational language processor selects the advertisement to resolve the request in response to determining that the natural language utterance includes incomplete or ambiguous information.

36. The system of claim 27 wherein the speech recognition engine recognizes the one or more words or phrases in the natural language utterance using a plurality of entries in one or more dictionary and phrase tables that are dynamically updated based on a history of a current dialog and one or more prior dialogs.

37. The system of claim 36, wherein the plurality of entries in the one or more dictionary and phrase tables are further dynamically updated based on one or more dynamic fuzzy set possibilities or prior probabilities derived from the history of the current dialog and the prior dialogs.

38. The system of claim 27, further comprising an adaptive misrecognition engine configured to determine that the conversational language incorrectly interpreted the words or phrases in response to detecting a predetermined event, wherein the conversational language processor reinterprets the words or phrases in response to the predetermined event.

39. The system of claim 38, wherein the predetermined event includes receiving one or more of a subsequent input proximate in time to the natural language utterance, a subsequent input that stops the conversational language processor from processing the request contained in the, natural language utterance, a subsequent input that overrides the request in a time shorter than an expected time to process the request, or a subsequent input that repeats the natural language utterance.

40. A system for selecting and presenting advertisements in response to processing natural language utterances, comprising:
   an input device that receives a natural language utterance containing at least one request at an input device;
   a speech recognition engine coupled to the input device, wherein the speech recognition engine recognizes one or more words or phrases in the natural language utterance;
   a conversational language processor coupled to the speech recognition engine, wherein the conversational language processor is configured to:
      interpret the recognized words or phrases, wherein interpreting the recognized words or phrases includes establishing a context for the natural language utterance;
      select an advertisement in the context established for the natural language utterance; and
      present the selected advertisement via an output device; and an adaptive misrecognition engine configured to determine that the conversational language incorrectly interpreted the words or phrases in response to detecting a predetermined event, wherein the conversational language processor reinterprets the words or phrases in response to the predetermined event.

41. The system of claim 40, wherein the predetermined event includes receiving one or more of a subsequent input proximate in time to the natural language utterance, a subsequent input that stops the conversational language processor from processing the request contained in the natural language utterance, a subsequent input that overrides the request in a time shorter than an expected time to process the request, or a subsequent input that repeats the natural language utterance.

42. The system of claim 40, wherein to recognize the words or phrases in the natural language utterance, the speech recognition engine is configured to:

map a stream of phonemes contained in the natural language utterance to one or more syllables that are phonemically represented in an acoustic grammar; and generate a preliminary interpretation for the natural language utterance from the one or more syllables, wherein the preliminary interpretation generated from the one or more syllables includes the recognized words or phrases.

43. The system of claim 40, wherein the conversational language processor selects the advertisement to resolve the request in response to determining that the natural language utterance includes incomplete or ambiguous information.

44. The system of claim 40, wherein the conversational language processor selects the advertisement based on information related to one or more of the recognized words or phrases, an action associated with the request, a personalized cognitive model derived from an interaction pattern for a specific user, a generalized cognitive model derived from an interaction pattern for a plurality of users, or an environmental model derived from environmental conditions or surroundings associated with the specific user.

45. The system of claim 44, wherein the conversational language processor is further configured to:

track an interaction pattern with the advertisement presented via the output device; and update one or more of the personalized cognitive model, the generalized cognitive model, or the environmental model based on the interaction pattern tracked for the advertisement.

46. The system of claim 45, wherein the conversational language processor updates one or more of the personalized cognitive model, the generalized cognitive model, or the environmental model to build statistical profiles for selecting subsequent advertisements in response to subsequent natural language utterances.

47. The system of claim 46, wherein the statistical profiles identify affinities between the advertisement presented via the output device and one or more of the recognized words or phrases, the action associated with the request, the personalized cognitive model, the generalized cognitive model, or the environmental model.

48. The system of claim 45, wherein the conversational language processor is further configured to:

build long-term shared knowledge and short-term shared knowledge in response to updating one or more of the personalized cognitive model, the generalized cognitive model, or the environmental model; and interpret a subsequent natural language utterance received at the input device language processor using the long-term shared knowledge and the short-term shared knowledge.

49. The system of claim 45, wherein the interaction pattern tracked for the advertisement includes an action performed in response to a subsequent request that identifies the advertisement.

50. The system of claim 49, wherein the action includes executing a task or retrieving information based on the subsequent request that identifies the advertisement.

51. The system of claim 40, wherein the speech recognition engine recognizes the one or more words or phrases in the natural language utterance using a plurality of entries in one or more dictionary and phrase tables that are dynamically updated based on a history of a current dialog and one or more prior dialogs.

52. The system of claim 51 wherein the plurality of entries in the one or more dictionary and phrase tables are further dynamically updated based on one or more dynamic fuzzy set possibilities or prior probabilities derived from the history of the current dialog and the prior dialogs.

* * * * *